Feb. 27, 1923.

G. A. WITTE.

PROCESS FOR ELECTRICAL PRECIPITATION OF SUSPENDED PARTICLES FROM GASES.
FILED FEB. 19, 1921.

1,446,778.

Electrical precipitator

INVENTOR.
Gustav A. Witte
BY Arthur P. Knight
ATTORNEY.

Patented Feb. 27, 1923.

1,446,778

UNITED STATES PATENT OFFICE.

GUSTAV A. WITTE, OF PHILADELPHIA, PENNSYLVANIA, ASSIGNOR TO INTERNATIONAL PRECIPITATION COMPANY, OF LOS ANGELES, CALIFORNIA, A CORPORATION OF CALIFORNIA.

PROCESS FOR ELECTRICAL PRECIPITATION OF SUSPENDED PARTICLES FROM GASES.

Application filed February 19, 1921. Serial No. 446,456.

*To all whom it may concern:*

Be it known that I, GUSTAV A. WITTE, a citizen of the United States, residing at Philadelphia, in the county of Philadelphia, and State of Pennsylvania, have invented a new and useful Process for Electrical Precipitation of Suspended Particles from Gases, of which the following is a specification.

This invention relates to the art of electrical precipitation of suspended particles from gases passing from furnaces, or other apparatus, and relates particularly to the treatment of such gases in which the suspended material is in a condition which renders it difficult to precipitate, by reason of its light and flocculent nature, as in the case of soot or carbon smoke, this condition is liable to arise in the operation of retorts for distillation of coal, or like material, or in the operation of boiler furnaces, or other furnaces in which combustion is more or less incomplete, resulting in the production of soot.

My invention provides for overcoming the difficulties incident to the precipitation and collection of suspended material from gases of the above described nature; this object being attained by distributing into such gases a solid pulverulent material of a coarser and heavier nature than the suspended material in the gases, which added material acts both as a weighting agent and as a granulating and compacting agent, that is to say it forms with the precipitated material a deposit which is compact and granular in nature as opposed to a flocculent, loose deposit.

Figure 1:
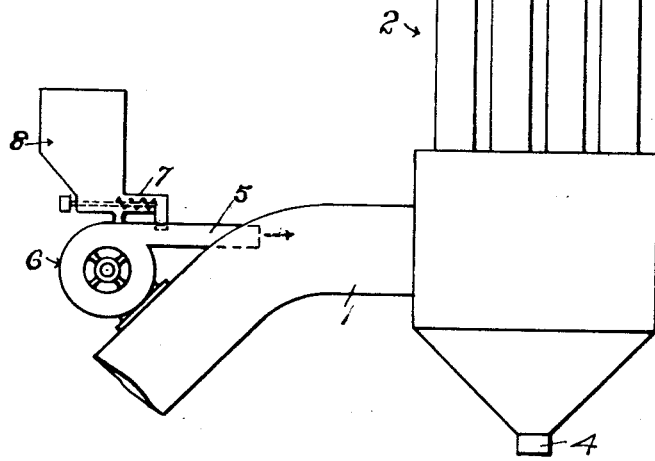
Figure 2:
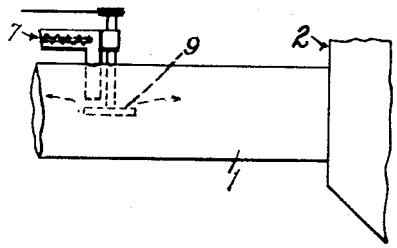

The accompanying drawings illustrate suitable forms of apparatus for carrying out the invention, Fig. 1 being a side elevation of such an apparatus and Fig. 2 a partial side elevation showing a modified arrangement for supplying the weighting material.

My invention may be carried out as follows:

A suitable weighting and granulating medium, such as finely divided clay, fuller's earth, soapstone, sand, dust (cement kiln flue dust), or finely divided rock or earth of any kind which is heavier and more compact than the deposit which would be formed by precipitation of the material suspended in the gases, is distributed into the stream of gases passing to the electrical precipitator so as to become thoroughly distributed throughout the body of gases. This may be effected by injecting such finely divided solid material into the gas stream by blowing it in with a current of air, or steam, or other gas, or mechanical distributing means of any well known type. Fig. 1 illustrates an apparatus providing for injection of a solid material by means of a current of air, the solid material being thus injected into the intake flue 1, of an electrical precipitator 2, having an outlet flue 3 and outlet means 4, for the collected or precipitated material. The injecting apparatus may comprise a nozzle 5 extending into the intake flue 1 and connected to receive air from the blower 6, suitable means such as a feed device 7 being provided for feeding finely divided solid material from a bin 8 into the pipe or nozzle 5, or as shown in Fig. 2, the solid material may be fed by feed means 7 to a mechanical distributor 9, consisting of a rotating disc for distributing the solid material into the flue gases in the ordinary manner of such mechanical distributing means. As the gas is then passed through the electrical precipitator and is subjected to the action of an electrical field therein produced between discharge and collecting electrodes in the usual manner, the material suspended in the gases, including the weighting and granulating agent aforesaid, is deposited on the electrodes, and especially on the collecting electrodes, and is removed from such electrodes from time to time by jarring, brushing, or otherwise. By reason of the weighting and granulating effect of the material added to the gases and deposited along with the material originally suspended in the gases, I ensure that the material so precipitated will remain on the electrodes instead of being carried along by the gases. This is of especial importance in the case of gases where the precipitated material includes more or less soot. It has been found that in the precipitation of such material there is a tendency for the light, flocculent soot particles to be carried along by the gas stream for the reason that they do not form a compact adherent deposit on the electrodes but either fail to adhere, or adhere only loosely to the electrodes, and on account of their lightness are easily swept along by the gas stream. The dust, clay, or other solid finely divided material, when precipitated along with the soot forms a heavy more or less compact and granular deposit which adheres to the electrodes sufficiently to prevent being swept along with the gases, but can be readily dislodged by jarring, or brushing, and when so dislodged will fall by gravity into the collecting means in the bottom of the precipitator.

While my invention is particularly described as applied to the precipitation of soot, it will be understood that it is equally applicable to the precipitation of light fume of any kind which presents the same physical properties and the same difficulties in collection and which can be advantageously treated by the process above described for facilitating the collection and removal of the fume.

What I claim is:

1. The process of precipitating from gases material suspended therein and tending to form a light flocculent deposit, which consists in distributing in such gases a finely divided solid material of a granular nature, adapted to act as weighting, compacting and granulating medium and then subjecting the gases to electrical precipitating action to precipitate such weighting, compacting, and granulating medium, together with the other material suspended in the gases and to form with such other material a compact, granular, heavy deposit.

2. The process of precipitating soot, or other light, flocculent suspended material from gases, which consists in distributing in the gases containing such material a weighting, compacting and granulating agent heavier than the soot and forming therewith, when electrically precipitated, a heavy granular deposit, and then subjecting the gases to electrical precipitating action to precipitate such weighting and granulating agent along with the soot.

In testimony whereof I have hereunto subscribed my name this 16th day of February, 1921.

GUSTAV A. WITTE.